US005695582A

United States Patent [19]

Beeteson et al.

[11] Patent Number: 5,695,582

[45] Date of Patent: Dec. 9, 1997

[54] METHOD AND APPARATUS FOR BONDING

[75] Inventors: John S. Beeteson, Skelmorlie; Frank John Martin, North Kelvinside, both of United Kingdom

[73] Assignee: International Business Machines Corporation, Armonk, N.Y.

[21] Appl. No.: 442,274

[22] Filed: May 16, 1995

[30] Foreign Application Priority Data

Oct. 21, 1994 [GB] United Kingdom .................... 9421238

[51] Int. Cl.[6] .................................................. B32B 17/06

[52] U.S. Cl. ..................... 156/99; 156/275.5; 156/275.7; 156/379.6

[58] Field of Search .................................... 156/99, 275.5, 156/275.7, 379.6

[56] References Cited

U.S. PATENT DOCUMENTS

| | | |
|---|---|---|
| 4,656,522 | 4/1987 | Piascinski et al. . |
| 5,417,791 | 5/1995 | Beeteson et al. . |

FOREIGN PATENT DOCUMENTS

| | | |
|---|---|---|
| 0366500 | 5/1990 | European Pat. Off. . |
| 3643765 | 6/1987 | Germany . |
| 60-017835 | 1/1985 | Japan . |
| 909333 | 10/1962 | United Kingdom . |
| 950779 | 2/1964 | United Kingdom . |
| 2015427 | 9/1979 | United Kingdom . |

OTHER PUBLICATIONS

IBM Technical Disclosure Bulletin, vol. 38, No. 3, Mar. 1995, pp. 575–576, "Bonding Face Panels To Cathode Ray Tubes".

*Primary Examiner*—Jenna Davis
*Attorney, Agent, or Firm*—Scully, Scott, Murphy & Presser

[57] ABSTRACT

A method and apparatus for bonding faceplates 10 to visual display unit (VDU) screens 20 is described. Adhesive material 170 is dispensed between the faceplate and the VDU and is selectively cured from the center outwards.

17 Claims, 3 Drawing Sheets

METHOD AND APPARATUS FOR BONDING

The present invention relates to a method and apparatus for bonding transparent faceplates or overlays to the screens of cathode ray tubes (CRTs) using transparent adhesive material. The invention finds particular, but not exclusive, use in the manufacture of a computer monitor having a touch-enabled display in which the faceplate has associated touch-stimuli sensors.

Known methods for bonding faceplates onto monitors involve positioning spacers at the edges of the CRT or integrated tube component (ITC) screen, or of the faceplate, offering the faceplate up to the ITC screen, and sealing the edge of the faceplate to the ITC to provide a physically contained volume for the adhesive. The seal may have a plurality of pin-holes around its periphery. The face of the ITC is held vertical, oriented so that an opening in the seal is at the top edge. Epoxy resin, which is mixed and outgassed, is then pumped into the opening. The resin is allowed to run out of the pin-holes while the contained volume is being filled, until the operator determines that the space between the ITC and the faceplate is satisfactorily filled. The pin-holes and the filling opening are then covered and the resin is cured. It is generally necessary to trim excess resin from the edges of the assembly after curing. Example methods of the above type are described in relation to the lamination of a transparent safety panel to a CRT screen in U.S. Pat. No. 4,656,522.

SU-A-1446868 describes a method for bonding an anti-glare filter to a CRT in which the filter is positioned horizontally at the bottom of a mould, with transparent spacers set at its corners. Resin is poured over the filter and the CRT is then lowered into the mould to press against the resin. The mould walls provide peripheral containment of the resin.

Several resins are suitable for use in such bonding processes, including those which are flexible when set and those that are hard when set such as CIBA 4001. (CIBA is a trade mark of Ciba-Geigy A.G.) The hardness associated with this resin produces problems of adhesion during curing with ultra-violet (UV) light. A slight shrinkage occurs during setting and because the material is hardening all over the panel surface at the same time considerable stresses are set up. This causes delamination of large areas and if the touch plate has any faults (e.g. microcracks) then the glass can shatter.

A more efficient method for bonding faceplates to VDU screens is required. It is desired to increase the scope for automation over the existing faceplate bonding processes (which are generally reliant on operator judgement), and generally to increase the speed and reduce the cost of the process.

Accordingly, viewed from one aspect the present invention provides a method for attaching a faceplate to the screen of a visual display unit by adhering together a surface of the faceplate and the screen, the method comprising the steps of: dispensing a volume of a transparent adhesive material onto at least one of the surfaces; moving the surfaces towards each other and causing the adhesive material to spread across the surfaces; curing adhesive material at a predetermined area of the faceplate; and progressively increasing the area of cured adhesive material in a direction away from the predetermined area towards the edges of the faceplate, thereby securing the faceplate to the screen of the visual display unit.

An advantage of this method is that it helps to avoid air bubbles becoming trapped between the faceplate and the VDU screen. The avoidance of air bubbles in the adhesive layer between the faceplate and the VDU screen is important because of the undesirability of visible air-adhesive interfaces within this layer and the visual effects which will arise if the layer separating the faceplate and the VDU screen contain patches which have markedly different refractive indexes. The adhesive material should generally be outgassed prior to the step of dispensing adhesive onto a surface to be adhered, assuming the adhesive material is such as to require such a process. A further advantage is that it helps to prevent destructive stresses during resin cure.

In accordance with a preferred embodiment of the present invention the adhesive material is first cured at a central area of the faceplate and this area progressively enlarged to encompass the whole faceplate. However it is also possible to cure the adhesive material by curing along an edge of the faceplate and then extending this area in one direction to cover the whole faceplate.

In accordance with a preferred embodiment of the present invention the steps of curing the adhesive material include irradiating it with ultraviolet radiation. An advantage of UV cure is that it speeds and cheapens the production process. It also allows the use of hard resins and therefore considerably widens the choice of suitable materials. Although ultraviolet radiation is used in the preferred embodiment it is also possible to carry out the invention with other types of electromagnetic radiation such as infra-red, providing a suitable adhesive material is employed.

In order that the invention may be fully understood a preferred embodiment thereof will now be described, by way of example only, with reference to the accompanying drawings in which.

Figure 1:
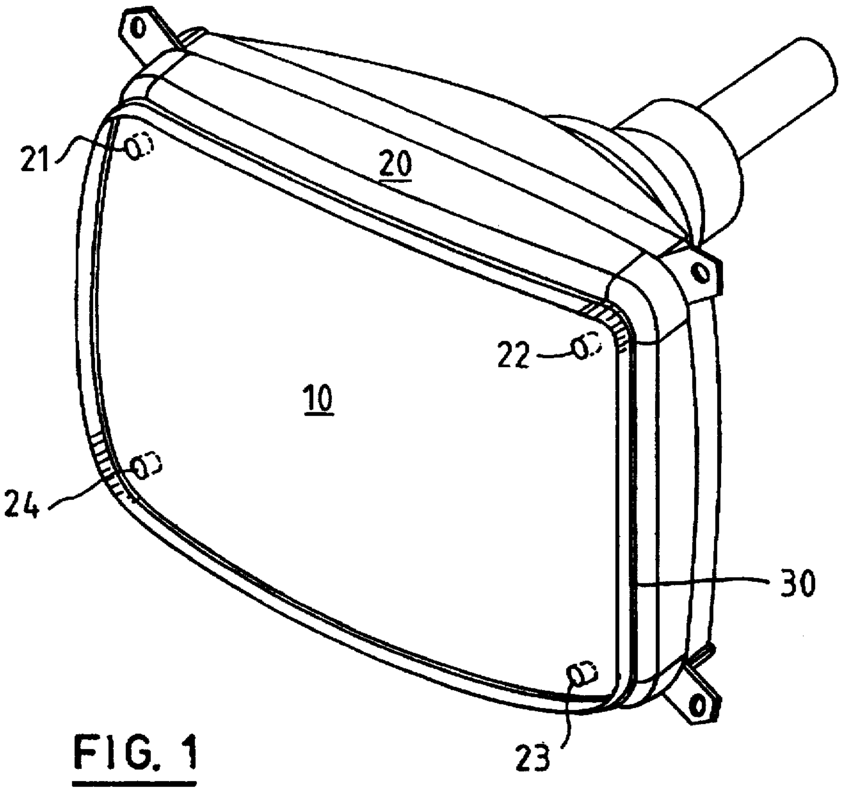
FIG. 1 shows a perspective view of a CRT assembly to which a touch-plate has been bonded in accordance with an implementation of the present invention.

With reference to FIG. 1 an example of a touch-input enabled display unit having a touch-plate 10 bonded to the face of a CRT 20 by a uniform layer or film 30 of a transparent, adhesive, elastic compound. A transducer array is mounted on the touch-plate as indicated by 21, 22, 23 and 24 which produce respective electrical signals which may be processed by a signal conditioning and analogue to digital (A to D) converter portion of the screen input adapter (not shown). The signal conditioning and A to D conversion portion then produces a binary data output indicative of the relative forces measured by the four transducers. The binary data output is therefore representative of a location on the display at which a touch stimulus is applied.

Figure 3:
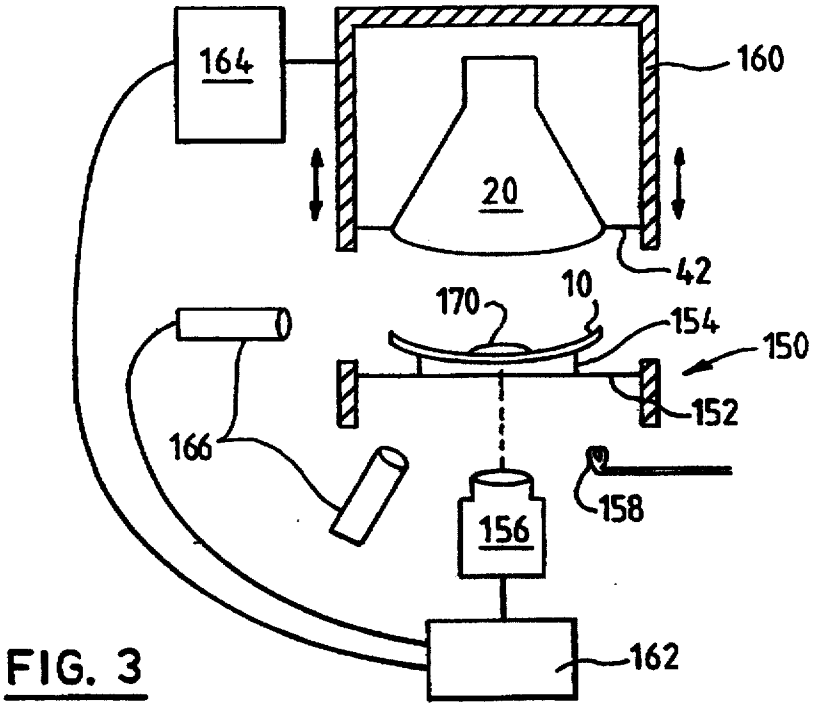
FIG. 3 shows the arrangements of the various components of bonding apparatus in accordance with an embodiment of the present invention.
Figure 2:
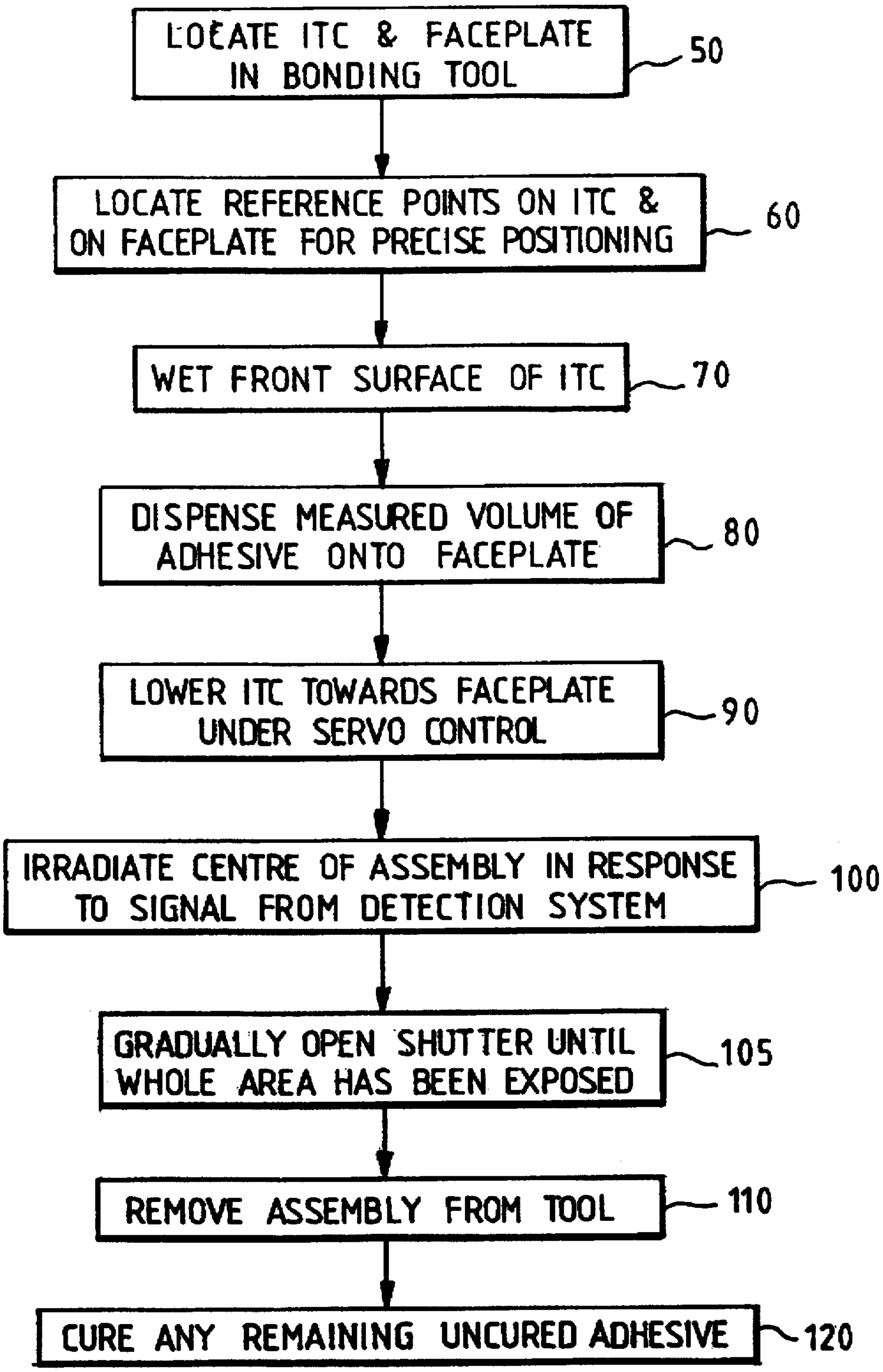
FIG. 2 shows a flow diagram of the sequence of steps performed in the attachment of a faceplate to a visual display unit in accordance with an embodiment of the invention.

An automated method of touch-input enabled display manufacture is represented in FIG. 2 as a sequence of process steps and an example of the apparatus used is shown schematically in FIG. 3. A faceplate 10 and an integrated tube component (ITC) 20 are each located, step 50, in a respective support tool 150,160 for bonding together. The first tool is a location plate 152 for the faceplate which supports the faceplate in a horizontal position with its concave face upwards, by means of positioning pins 154. The second tool carries the ITC via lugs 42. The lugs are not located in very precise positions (their positions may typically vary by 2 mm in a direction perpendicular to the plane of the display). Specific reference points for automatic positioning are therefore located, step 60, on each of the faceplate and the ITC surface. Glass surfaces such as CRT screens are conventionally specified by four reference points often referred to as the Z points. They are typically near the screen edge along the diagonals, and locate the surface in space. For one implementation of the reference point location, four location probes (not shown) for the ITC and four (in the form of the support pins 154) for the faceplate are set at the known Z point positions. The probes for the ITC, which are spring loaded, are brought into contact with the ITC surface to allow the vertical positions of the reference points to be determined, for example by a computer, by connecting the probes for example to a linear potentiometer. Optical sensors could be used as an alternative to the potentiometer connection.

The measurement of the ITC Z point positions uses three horizontally positioned location pins (not shown) in addition to the aforementioned probes. The edges of the CRT screen are pushed against the pins to determine the location—two pins against one edge and one against a second perpendicular edge. Location information can again be stored in a computer. The position of the front surface of the ITC is then precisely known, in three dimensions. The initial position of the faceplate in its positioning tool is determined by its support pins 154. The positioning of these pins, which are small enough not to obscure electromagnetic radiation transmitted from beneath the faceplate, is then further controlled (motor driven) to allow alignment with the plane of the CRT screen after its Z point measurement, without the need for physical spacers to be positioned between the surfaces. The faceplate support tool also uses three horizontally positioned location pins to fully determine its position. The distance between the faceplate and the CRT screen is now known.

Whilst the embodiment of the invention described above uses three dimensional positioning measurement for both the faceplate and the CRT, and then adjusts the position of the faceplate to provide correct alignment, alternative embodiments could equally provide for adjustment of the positioning of both components or of the CRT only.

The front surface of the ITC is then wetted, step 70, with a dilute solution of the adhesive material in a solvent, and the solvent is allowed to evaporate. This guarantees that the surface of the ITC, which will generally be textured so as to reduce reflections therefrom, is completely penetrated by adhesive and no air bubbles are entrapped. If the wetting characteristics and viscosity of the base are optimised, this additional wetting step is not required.

A measured volume of outgassed epoxy or acrylic resin is dispensed, step 80, onto the centre of the faceplate. A UV-curable adhesive which may be used is CIBA Araldite 4001 or Loctite 350 (Loctite is a trade mark of Loctite Corporation). Other adhesive materials could be used as alternatives. A small quantity of a surfactant is advantageously added to help to eliminate bubble formation. The resin compound (or other adhesive material) desirably has a similar refractive index to the two layers which it bonds together, but the refractive index of the textured coating on the ITC front surface is generally different from that of the polished rear surface of the faceplate. Minimising reflections from each of the glass-adhesive interfaces thus requires the adhesive material to have a refractive index which is either a compromise between these two glass surfaces or is not constant. The acrylic or epoxy resin may be selected to chemically soften and swell the silica/polymer textured coating which is known to be provided on a CRT screen to reduce surface reflections. This chemical change has the effect of producing a gradual rather than an abrupt change in refractive index at the interface and thus further reduces reflections.

The ITC is then lowered, step 90, at a controlled rate towards the faceplate, under the control of servo-control signals from a movement controller 164. As the rate of lowering is increased, so is the tendency to entrap air behind the advancing adhesive-to-air interface. Thus, the rate of lowering is maintained at a rate which will avoid the entrapment. The lowering speed may be automatically controlled in response to signals from a visual detection system, which uses a television system 156,158 (described in more detail below). In an alternative embodiment, the ITC is manually lowered into position. As this lowering operation is continued, the approaching surfaces of the ITC and the faceplate force the resin 170 to spread out laterally from the centre to the edges of the plate, filling the gap between the ITC and the faceplate.

As the resin is forced to spread across the opposed surfaces towards the edge of the faceplate, its position is detected by a visual detection system. The detection system may comprise a television camera 156 which views the faceplate through the support plate 152 of the support tool 150. The underside of the faceplate is illuminated by visible light from a light source 158, and the camera captures images which are then sent to a capture frame store in a computer 162. Signal processing is performed to identify the position and speed of the air-to-resin interface at different times using identification of changes of refractive index. Typically, contrast and edge enhancement techniques common in optical signal processing will be used. One suitable visual detection system is the Synoptics Synapse system with the Semper 6Plus imaging language (Synoptics and Semper are trade marks of Synoptics Limited).

As the resin reaches the edge of the faceplate, a signal is transmitted from the detection system to a UV curing apparatus 166. This signal actuates irradiation, step 100, of the centre of the assembly with ultraviolet electromagnetic radiation, by controlling shutters in front of the UV light sources, to cure the resin at the central portion of the faceplate. The faceplate support tool must be optically clear to UV radiation. UV radiation sources are commonly used in industrial processes, and for this application can be selected to optimise wavelength to the particular resin actuator. Such a source of radiation is the Loctite UVAloc 1000. The signal actuating the irradiation apparatus may be generated at the instant that the advancing resin interface reaches the edge of the faceplate at any position (and then progressive selective curing and ITC lowering may be performed simultaneously until the resin has reached all points around the periphery of the faceplate). Alternatively mechanical seals may be brought into contact with the CRT and touchplate edges (leaving the corners open to allow air to be expelled).

Figure 4:
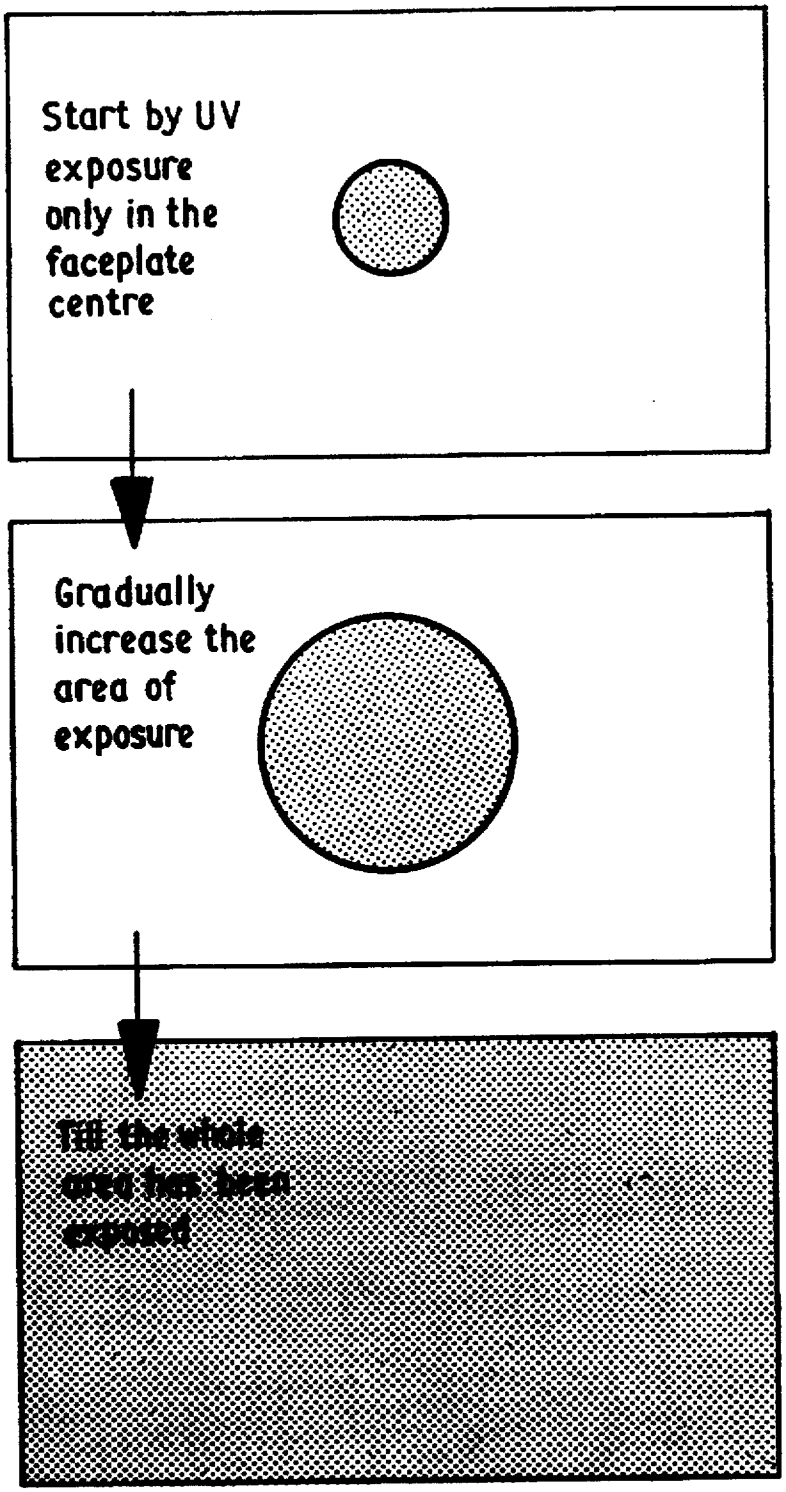
FIG. 4 shows the progressive cure principle of the present invention.

The first box of FIG. 4 shows a representation of the faceplate and the central irradiated area at step 100. The shutters in front of the UV light source 158 are mechanical and are motor controlled to gradually open at an even speed, step 105, such that the assembly is gradually illuminated by UV light from the centre outwards, thereby allowing shrinkage of the resin without stress. The second box of FIG. 4 shows the gradual increase in the area of exposure. As shrinkage takes place there is always liquid material which can be drawn in from the periphery of the panel. The third box of FIG. 4 shows exposure of the whole area of the faceplate.

The illumination is kept constant and the aperture is opened at a constant speed. This is to avoid a variation in exposure levels which may cause alignment of the resin molecules giving rise to optical birefringent effects in the cured material. These can be seen as brightness fluctuations in the viewed image under polarised or glancing angled light (which also causes polarisation).

The (vertical) gap between the faceplate and the ITC may be predetermined by the known Z point measurement, but preferably the visual detector determines when the resin has reached all points of the periphery of the faceplate and then the lowering is automatically stopped. Thus, the reference points on the faceplate and on the ITC are used to set the horizontal alignment and the visual sensor is used to determine the end point of the ITC's lowering movement. The vertical gap is thus adapted to any mechanical tolerance variations of the faceplate or the ITC screen, and there is no need for physical spacers.

The assembly is then removed, step 110, from the tool. The remaining uncured resin, if any, is then cured, step 120, by additional ultraviolet electromagnetic radiation through the faceplate. Alternatively, the remaining uncured resin is cured by infrared lamps or conduction heating. Step 120 is an additional precaution but should not really be necessary.

A method of attachment of a faceplate to a ITC screen of a CRT monitor for the manufacture of a touch-sensitive display has now been described byway of example implementation of the present invention. It will however be appreciated that the invention is also applicable to the attachment of other faceplates such as anti-reflective screens, and that the invention may use a different display device such as a liquid crystal display panel or a gas plasma panel. Additionally the method of the invention has been described as a stage in the production of a display unit but could equally be performed as a method of retrofitting touch panels to assembled monitors.

We claim:

1. A method for attaching a faceplate to the screen of a visual display unit by adhering together a surface of the faceplate and the screen, the method comprising the steps of:

dispensing a volume of a transparent adhesive material onto at least one of the surfaces;

moving the surfaces towards each other and causing the adhesive material to spread across the surfaces;

after the adhesive material has spread across the surfaces, curing adhesive material at a predetermined area of the faceplate; and progressively increasing the area of cured adhesive material in a direction away from the predetermined area towards the edges of the faceplate, thereby securing the faceplate to the screen of the visual display unit.

2. A method as claimed in claim 1 wherein the predetermined area is the central area of the faceplate.

3. A method as claimed in claim 1 wherein the steps of curing the adhesive material include irradiating the adhesive material with electromagnetic radiation.

4. A method as claimed in claim 3 wherein the electromagnetic radiation is ultraviolet radiation.

5. A method as claimed in claim 1 further comprising the step of maintaining a supply of adhesive material between the surfaces to compensate for shrinkage of the cured adhesive material.

6. A method as claimed in claim 1 wherein the step of curing adhesive material at the predetermined area of the faceplate involves masking adhesive material not located in the predetermined area.

7. A method as claimed in claim 2 wherein the steps of curing the adhesive material include irradiating the adhesive material with electromagnetic radiation.

8. A method as claimed in claim 1, wherein said progressively increasing step comprises progressively opening a shutter located between said predetermined area and a source of electromagnetic radiation.

9. A method as claimed in claim 8, wherein the progressive shutter opening step progressively opens said shutter at a constant speed.

10. A method as claimed in claim 8, further comprising maintaining said electromagnetic radiation at a constant level.

11. A method as claimed in claim 8, wherein the progressive shutter opening step mechanically opens said shutter at a constant speed using a motor.

12. Apparatus for attaching a faceplate to the screen of a visual display unit by adhering together a surface of the faceplate and the screen, the apparatus comprising:

means for dispensing a volume of a transparent adhesive material onto at least one of the surfaces;

means for moving the surfaces towards each other and causing the adhesive material to spread across the surfaces;

means for curing adhesive material at a predetermined area of the faceplate, said curing means including a mask located on an area of the faceplate other than said predetermined area; and means for progressively increasing the area of cured adhesive material in a direction away from the predetermined area towards the edges of the faceplate, thereby securing the faceplate to the screen of the visual display unit.

13. Apparatus as claimed in claim 12 wherein the means for curing the adhesive material comprises means for irradiating the adhesive material with electromagnetic radiation.

14. Apparatus for attaching a faceplate to the screen of a visual display unit by adhering together a surface of the faceplate and the screen, the apparatus comprising:

means for dispensing a volume of a transparent adhesive material onto at least one of the surfaces;

means for moving the surfaces towards each other and causing the adhesive material to spread across the surfaces;

means for curing adhesive material at a predetermined area of the faceplate; and means for progressively increasing the area of cured adhesive material in a direction away from the predetermined area towards the edges of the faceplate, thereby securing the faceplate to the screen of the visual display unit, wherein said means for progressively increasing the area of the cured adhesive material is a shutter that progressively opens and is located between said predetermined area and a source of electromagnetic radiation.

15. Apparatus as claimed in claim 14, wherein the shutter is configured to progressively open at a constant speed.

16. Apparatus as claimed in claim 14, wherein the source is a constant level electromagnetic radiation source.

17. Apparatus as claimed in claim 14, wherein the shutter is a mechanical shutter that opens at a constant speed using a motor.

* * * * *